Oct. 24, 1972  A. J. DICKENS, JR  3,700,461
GAS SUSPERSION AGGLOMERATION
Filed April 7, 1970  3 Sheets-Sheet 2
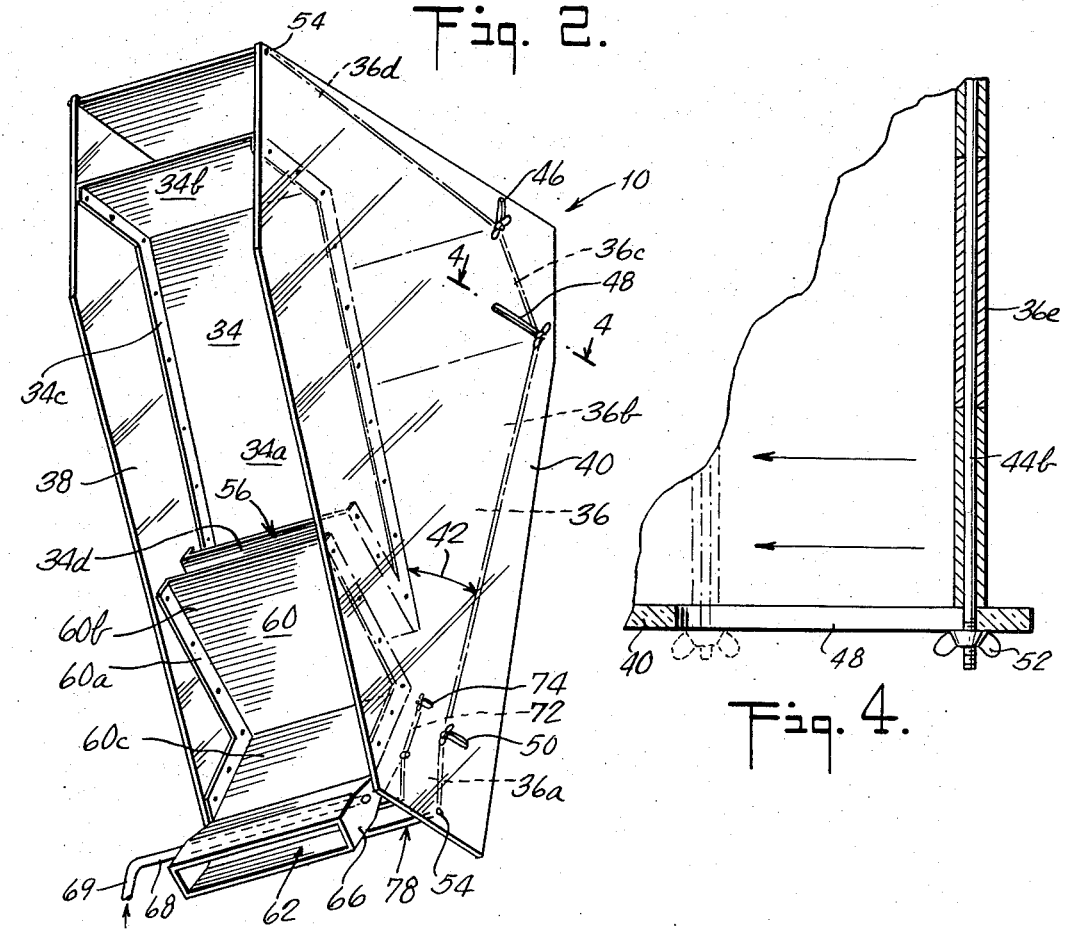
Fig. 2.
Fig. 4.
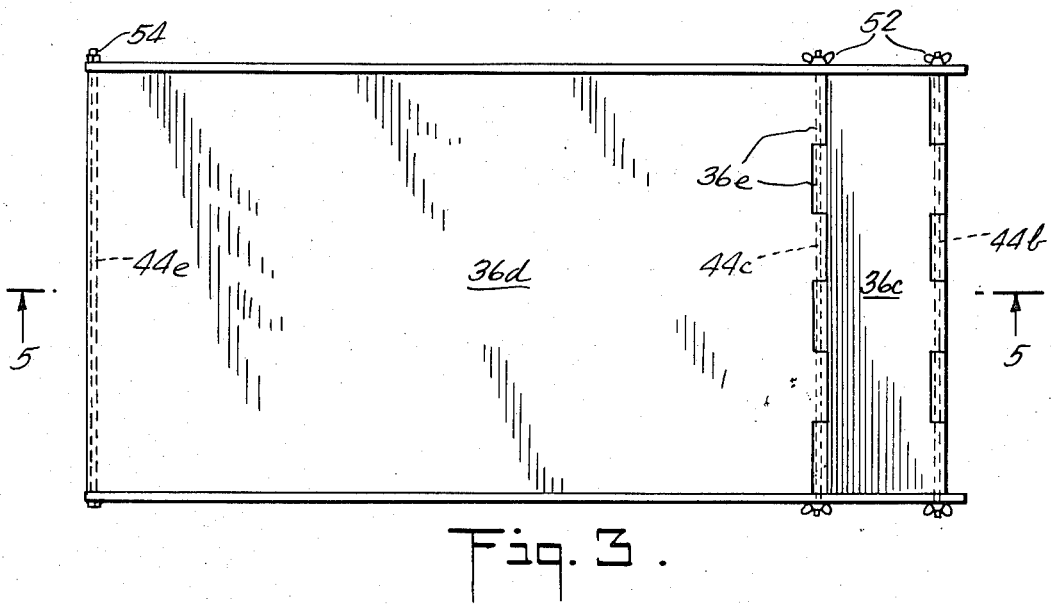
Fig. 3.

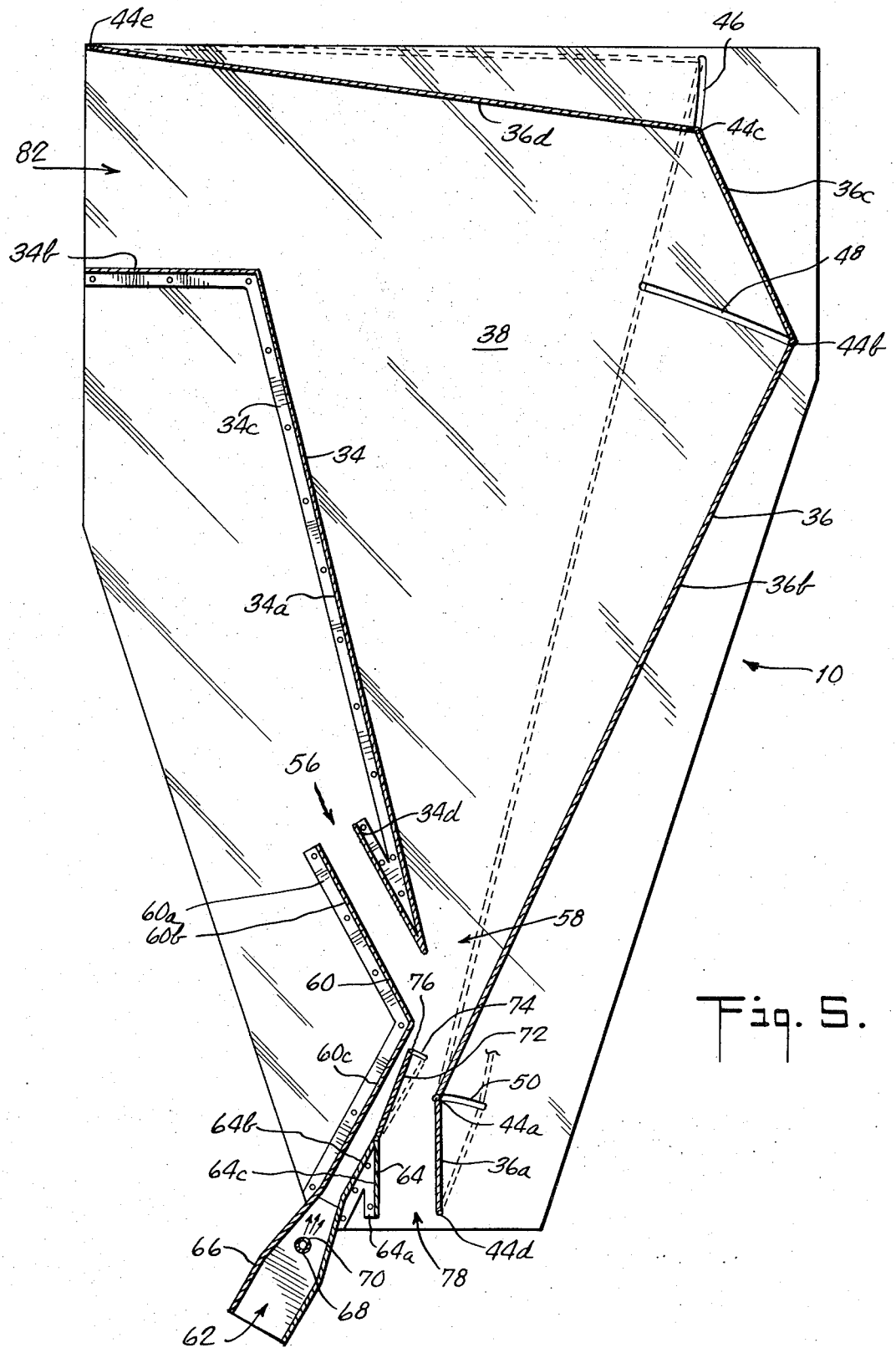

United States Patent Office

3,700,461
Patented Oct. 24, 1972

3,700,461
GAS SUSPENSION AGGLOMERATION
Alvin J. Dickens, Jr., Chapel Hill, N.C., assignor to R. J. Reynolds Tobacco Company, Winston-Salem, N.C.
Filed Apr. 7, 1970, Ser. No. 26,204
Int. Cl. A23c 9/00; A23g 7/00
U.S. Cl. 99—26                      12 Claims

ABSTRACT OF THE DISCLOSURE

An agglomerator for agglomerating fine particles of matter such as water wettable food particles and/or food additives, including an agglomeration chamber having a greater cross-sectional area in its upper portion than in its lower portion and having adjustably movable walls for controlling the size of the agglomerated product. Material to be agglomerated is supplied to an entrance zone at the base of the chamber where it is wetted and then suspended in a gaseous (air) medium in the chamber. An adjustable baffle at the entrance zone controls the flow of the wetting or active agglomerating agent and the gaseous medium. The particles are caused to agglomerate to a size sufficient to overcome the buoyant force of the gaseous medium flowing through the chamber and then to be discharged therefrom adjacent the entrance zone, while the gaseous medium leaves the chamber through an exhaust zone at the upper portion of the chamber.

BACKGROUND OF THE INVENTION

This invention relates to agglomeration of particulate matter into particles of larger size. In particular, the invention concerns the agglomeration of dry food particles and/or food additives into larger size particles so that the particles may more readily be dispersed in a liquid, such as water, milk and the like.

Conventional processing techniques such as spray drying and grinding or milling produce materials having very small particle sizes. The particle size distribution may vary widely and it is not uncommon to deal with mixtures ranging from 5 to 150 microns in average diameter. When such a powder is added to a liquid, the weight of each individual particle cannot overcome normal surface tension and thus tends to float. Also, due to the small size of some of the particles, there are inadequate interstices to allow capillary action between the particles, thereby preventing the uniform wetting of each particle and resulting in packing of the particles. Large masses of material are wetted from the outside, forming a barrier of highly concentrated product, preventing internal wetting and resulting in the formation of large, undispersed lumps of sticky material.

This problem may be overcome by agitating the mixture, although in many cases elaborate mixing equipment is required. However, it is preferable to solve this problem by agglomerating the powder to produce large porous clusters of individual particles. These agglomerates are readily dispersible in a liquid, see Moore et al., Agglomeration of Dried Materials, 60 Chemical Engineering Progress No. 5, p. 63 (May 1964).

Agglomeration greatly improves dispersibility by providing the necessary characteristics for the simultaneous, uniform, and complete wetting of each particle. The actual solubility of the dispersed product is unchanged from that existing in the dried state. In other words, agglomeration increases the rate and quality of dispersion but has no effect on solubility.

Although the major advantage of agglomeration is the improvement of dispersibility, agglomeration also provides a method of bulk density control allowing for desired product weight based on volume measure. This, in turn, is related to the over-all particle size distribution of the material. Agglomeration improves the flowability of the dry product, permitting uniform handling, measuring and, in some instances, bulk conveying. In those processes where light, very fine flocculent types of powders are to be handled, agglomeration eliminates the dust problem. Finally, agglomeration devices may be effectively used for the purpose of incorporating controlled moisture additions.

There are several commercial methods of producing agglomerated particles. While these differ in detail, they all involve the following basic steps:

(1) Wetting: In this step, the particles are uniformly surface wetted in a turbulent stream using a suitable wetting agent, usually water. The wetting agent may be in the vapor phase (steam), or a combination of liquid and vapor phases (water mist and steam).

(2) Equilibration: In this stage, the wetted particles are retained for agglomeration and for moisture equilibration.

(3) Drying: In the third step, the agglomerates are dried to reduce moisture content to the desired level.

(4) Cooling: In the final step, the agglomerates are cooled and selectively screened as necessary prior to packaging or storing.

In one form of agglomerator, a relatively small moistening chamber is utilized, as shown in Griffin U.S. Pat. No. 2,893,871. The product is fed through a pneumatic conveyor and a rotary-feed valve and is introduced in a narrow stream across the upper section of the agglomeration chamber. The dry powder falls by gravity between two jet tubes through which a suitable agglomerating fluid is constantly injected in a highly atomized form. Usually, the agglomerating fluid is steam, water or a combination of both. As the powder passes through this zone, the particles are uniformly wetted on the outside and brought into intimate contact with each other by induced turbulence. In addition, the agglomeration chamber is provided with a series of radial slots to which air at ambient temperature is charged to cause a vortexing motion of the particles. This arrangement not only causes further collision of the sticky particles but also initiates condensation of the moisture introduced at the top. Control of the air flow rate controls the flow pattern and provides a means of particle temperature control. The product is then dropped through an air heated chamber of small dimensions to continue surface evaporation.

The very large clusters of agglomerated material are subsequently discharged from the bottom of the unit directly onto a conveyor belt, where the product is allowed sufficient time for all particles to come to uniform moisture equilibrium. The conditioned material is fed to a vibrating deck-type, air-heated afterdryer. Depending on the maximum air temperature that can be used and the required holding time, the material passes over several vertically stacked decks for drying. In some instances, varying air temperatures are used for each deck.

The material is discharged to a vibrating cooling deck and the cooled product is then fed to the sifter. Usually, the material is separated into select, oversize, and fine product. The fine product is reintroduced into the air conveying system and is returned to the inlet of the agglomerator, while the oversize material is passed through necessary crushing rolls and again returned to the sifter.

There is another process that combines agglomeration directly with spray drying. The spray dryer is operated with a lower outlet temperature than normal to produce a particle having a higher moisture content. The powder is passed directly into the agglomerator which is provided with perforated plates divided into three sections through which air passes upwardly. The plates are vibrated so that the powder will progress slowly through the agglomerator. In the first section, warm air is applied but not actual drying takes place; this is the equilibrating zone. In the second chamber, hot air is passed through the bed of clusters in sufficient quantity to dry the clusters to the desired final moisture content. In the third section, cold air is passed through the bed to reduce the temperature of the final product. In this system, the fines from the screening of the final material are returned directly to the spray dryer drying chamber. These fines will then adhere to the atomized droplets in the spray, see Louder U.S. Pat. No. 2,832,686.

A process shown in Gidlow et al. U.S. Pat. No. 2,995,773 employs a shaker-type conveyor for performing all four basic steps. Dry particles are fed onto a vibrating small mesh screen. A mixture of superheated steam and hot air is fed under the screen to convert the dry particles into tiny beads of syrup. Agglomerates are formed as additional falling dry powder adheres to the syrup nuclei. Continuing along the vibrating screen, moist particles pass over an area where hot air is introduced to remove the moisture. In a further section, the agglomerates produced are cooled by means of conditioned air blown through the vibrating screen. Undersize and oversize agglomerates are pneumatically conveyed back to the preparation area to be reworked with fresh dry material.

Still another system is that disclosed in Lee et al. U.S. Pat. No. 2,689,973. There fine solid particles are introduced into the lowermost portion of the agglomeration chamber. Streams of gas flow through an apertured plate surrounding the feed inflow to cause the particulate matter to form into a fluidized bed of solid material. When the particles are agitated by the gaseous flow to form nodules or pellets, the heavier agglomerated particles sink to the bottom of the chamber where they are discharged from the chamber via a conduit.

Although the above-described processes have been found more or less successful in agglomerating food particles, they all suffer from inherent limitations. None is flexible enough to accommodate different types of particles. All are relatively complex so that they cannot be rapidly disassembled and cleaned, which is a prerequisite for equipment employed in handling food products. The latter deficiency is particularly objectionable where the same apparatus must be used to process similar products having slightly different constituents.

SUMMARY OF THE INVENTION

An object of the present invention is to provide an agglomerator having flexibility in operation. A particular object of the invention is to provide agglomeration apparatus and method adapted to efficiently agglomerate a number of different kinds of particulate matter. Still another object is to provide variably adjustable agglomerating apparatus for improved control of the agglomerating process. A further object of the invention is to provide a compact and simple agglomerator which may be easily and rapidly disassembled, cleaned and/or repaired.

To these and other ends, the present invention contemplates an agglomeration chamber having a greater cross-sectional area in its upper portion than in its lower portion and being variably adjustable in its dimensions. Through an entrance zone in the lower or lowermost portion of the chamber particulate matter is supplied to the chamber, the matter being surface wetted at the entrance zone. The particulate matter is suspended in a gaseous medium in the chamber wherein it is caused to agglomerate into particles of sufficient size to overcome the buoyant force of the gaseous medium flowing therethrough and then be discharged at the entrance zone of the chamber and through a discharge passageway.

In accordance with the invention, the walls of the agglomeration chamber are defined by panels, at least one of which is movable relative to the entrance zone to vary the dimensions of the agglomeration chamber. Adjusting the walls of the chamber varies the flow of the gaseous medium through the chamber, thereby serving to produce agglomerates of varying sizes. For example, if large agglomerates are desired, gas flow in the lower portion of the chamber should be at a high velocity while gas flow in the upper portion of the chamber should be at low velocity. This is accomplished by decreasing the cross-sectional area of the entrance zone through which gas (air) flows into the chamber while increasing the cross-sectional area of the upper portion of the chamber. To obtain smaller agglomerates, the chamber is arranged in the opposite manner.

One wall of the chamber is fixed in position and is disposed at an angle of between about 5° and 45° from the vertical upwardly and outwardly. Preferably, this first wall is disposed at an angle of between about 15° and 30° from the vertical. A second wall is variably adjustable between a substantially vertical position and a position of about 45° from the vertical upwardly and outwardly. The included angle between the first and second walls should be at least about 15°. An exhaust zone is located in the uppermost portion of the chamber through which the fluid medium leaves the chamber.

Particulate matter to be agglomerated is supplied to the entrance zone of the chamber through a passageway. The crosss-ectional area of the supply passageway is preferably about one-half the cross-sectional area of the supply passageway is preferably about one-half the cross-sectional area of the discharge passageway.

A wetting agent, such as water, steam or a mixture of water and steam, is directed toward the particulate matter supplied to the entrance zone of the chamber to wet the surface of the particles. The passageway through which the wetting agent is directed is disposed at an angle of about 120° to the supply passageway, both such passageways being disposed at an angle of between about 45° and 75° from the horizontal. An adjustable baffle is disposed at the intersection of the wetting agent passageway and the discharge passageway so as to direct wetting agent in the desired direction and velocity against the particulate matter in the zone. The baffle, which is movable relative to the wetting agent passageway, is spaced from the nearest variable wall of the chamber a distance at least one-half but not more than twice the width of the discharge passageway.

A gaseous medium, such as air, is charged into the chamber to direct the particulate matter through the entrance zone into the agglomeration chamber wherein the wetted particles and agglomerates are suspended in the gaseous medium. Where the gaseous medium is air, the air passes through the chamber and out the exhaust zone at the upper portion thereof.

BRIEF DESCRIPTION OF THE DRAWINGS

FIG. 2 is a perspective view of the representative agglomerator of the present invention;

FIG. 3 is a top view of the agglomerator shown in FIG. 2;

FIG. 4 is an enlarged partial sectional view taken along the line 4—4 of FIG. 2; and FIG. 5 is a sectional view taken along the line 5—5 of FIG. 3.

DETAILED DESCRIPTION

Figure 1:
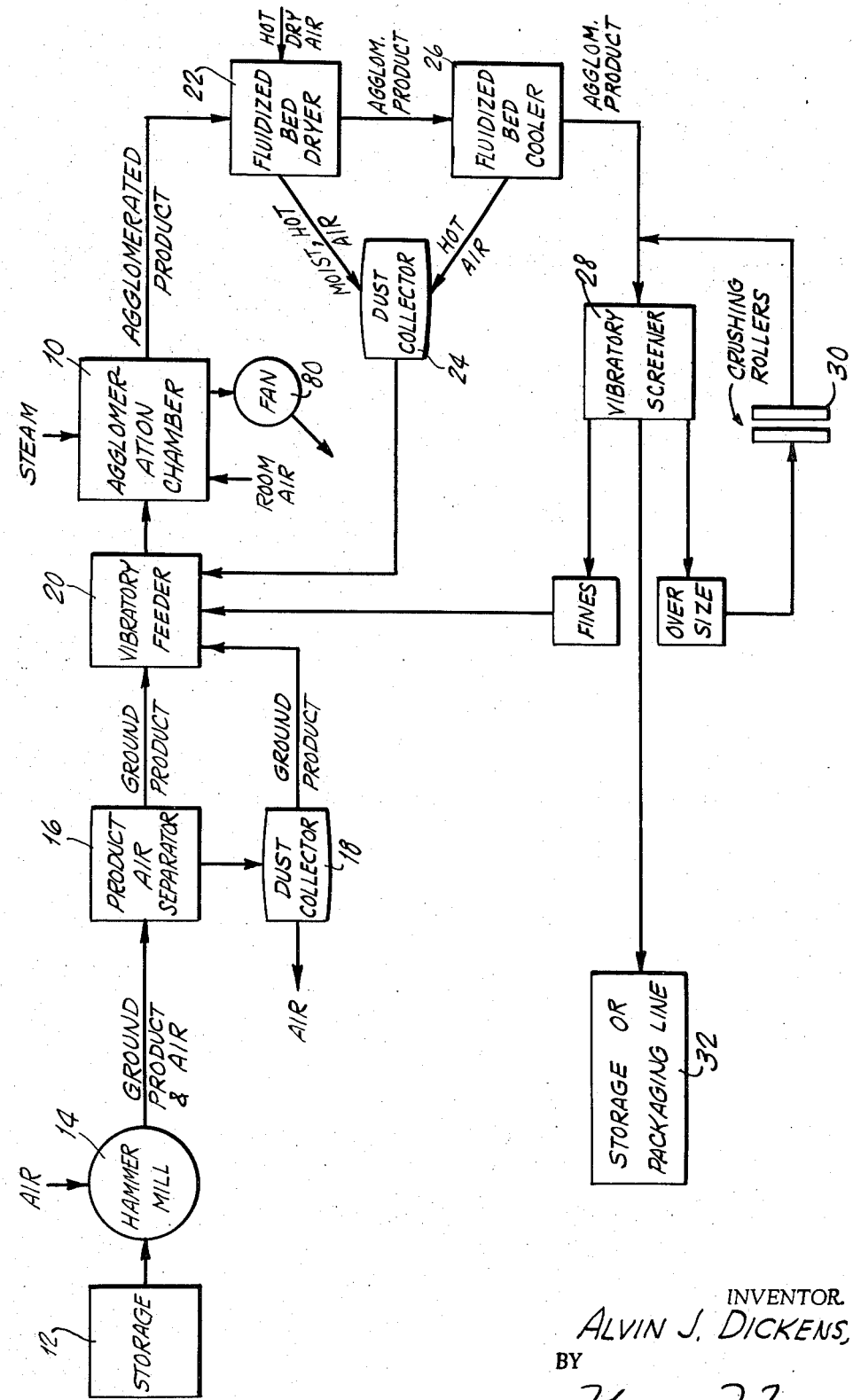
FIG. 1 is a schematic view of a processing line employing a representative agglomerator in accordance with the present invention.

Referring to FIG. 1, there is shown diagrammatically a representative processing system, such as a food processing system, in which the process of the present invention takes place. A representative agglomeration chamber 10 is shown employed in the system in conjunction with various other apparatus substantially conventional in the agglomerating art. This other apparatus shown in FIG. 1 is presented herein only briefly in order to show the environment of the invention.

Particles, such as food particles, to be agglomerated are contained in storage chamber 12, which may be of any suitable size and shape. Upon discharge from storage chamber 12, the particles of matter are ground to smaller size in hammer mill 14 and are then classified in product air separator 16. Dust is removed from the particles by product air separator 16 and distributed to dust collector 18. The finely divided particles are distributed to vibratory feeder 20. It is from vibratory feeder 20 that particles of matter are introduced to agglomeration chamber 10, as explained more fully below.

After agglomeration, the agglomerated product is dried in fluidized bed dryer 22. Dust particles that have not been agglomerated are removed by hot air passing through dryer 22 and are distributed to dust collector 24, from which they are returned to vibratory feeder 20. The dried agglomerated product is cooled in fluidized bed cooler 26 and then sized upon vibratory screener 28. Oversize material from vibratory screener 28 is crushed by rollers 30 and then returned to vibratory screener 28. Undersize material from vibratory screener 28 is returned to vibratory feeder 20 for reagglomeration. Suitable size agglomerated product is distributed to storage 32 or to a packaging line.

Many different types of food particles have been agglomerated using apparatus and method in accordance with the present invention. Primarily, the embodiment of the invention shown in the drawings is used to agglomerate materials which are hygroscopic, i.e. material that is highly soluble in the agglomerating medium, each particle having an adhesive quality when wetted. This type material generally yields multi-clustered agglomerates of large size. A second type of material that lends itself to agglomeration using apparatus and method in accordance with the invention is a combination of one material having relatively poor agglomerating characteristics and a material having relatively good agglomerating characteristics, e.g. cocoa and sugar.

The following products inter alia may be successfully agglomerated employing apparatus and method in accordance with the invention: instant cocoa base mixtures, starch, sugar, tannin extract powder, soluble sweet food products, wheat flour, ice cream stabilizers, soup powders, non-dairy coffee whitener, instant pudding, dried yeast, fruit-based flavorings, dextrine products, milk powder and gelatin and mixtures thereof.

Referring to FIG. 2 of the drawings, there is shown a representative agglomeration chamber 10 in accordance with the present invention. In the agglomeration chamber, generally indicated by reference numeral 10, surface wetted particulate matter is suspended in a gaseous medium flowing therethrough, the matter being caused to agglomerate within the chamber to a size sufficient to overcome the buoyant force of the gaseous medium and then to be discharged from the chamber. Preferably, agglomeration chamber 10 is constructed so that particulate matter being agglomerated therein may be viewed by the operator and so that the apparatus may be readily disassembled for cleaning and repairing. It is particularly important that apparatus used in processing food be relatively easy to disassemble, as food particles easily become lodged in small crevices where they deteriorate. The panels forming the walls of agglomeration chamber 10 are held together by a number of fastening elements so that the operator may within a short time disassemble the device. In agglomeration chamber 10 preferably at least one of the side walls thereof is fabricated of a transparent material, such as acrylic resin plastic sheet sold under the trademark Plexiglas or a like material, so that the operator may view the agglomeration process.

In the presently preferred construction agglomeration chamber 10 includes first wall 34 disposed in a substantially vertical position and second wall 36 also disposed in a substantially vertical position opposite first wall 34. A pair of side walls 38, 40 respectively connect first wall 34 and second wall 36 to substantially define chamber 10. First wall 34 and second wall 36 may be fabricated of any suitable material usable in handling food particles, such as stainless steel or the like. Side walls 38, 40 are shown in FIG. 5 as being fabricated from a transparent material, such as acrylic resin plastic sheet sold under the trademark Plexiglas. In accordance with one feature of the invention, first wall 34 and second wall 36 are preferably disposed to form an acute angle between them so that the cross-sectional area of chamber 10 is greater near the upper portion than at the lower portion thereof. Maintaining a larger cross-sectional area at the upper portion of chamber 10 than at the lower portion thereof reduces the velocity of gases flowing from the lower to the upper portion of the chamber, thereby serving to prevent gases flowing upwardly through chamber 10 from carrying agglomerated matter of the desired particle size out the uppermost portion of chamber 10. It also permits the particulate matter maintained within chamber 10 to form a "fluidized bed" of solid material. "Fluidized bed" is a term of art that refers to dense liquid-like suspension of solids that occur when an upflowing stream of gas passes through a mass of particulate matter. The fluidized bed has the appearance of a boiling liquid with its solid particles in rapid, turbulent motion. A fluidized bed has substantially uniform temperature prevailing throughout its volume. Such a condition is somewhat difficult to achieve in a cylindrical chamber. The inverted substantially pyramidal shape of chamber 10 employed in the apparatus of the present invention has been found most satisfactory.

First wall 34 of chamber 10 is disposed substantially vertical, such as disposed at an angle of at least about 5° but not greater than about 45° from the vertical. Preferably, first wall 34 is disposed at an angle of between about 15° and 30° from the vertical. First wall 34 generally slants outwardly in the direction away from second wall 36. Second wall 36 is also disposed substantially vertical, such as at an angle between a true vertical position and a position about 45° from the vertical outwardly away from the first wall 34. It is preferred that included angle 42 between first wall 34 and second wall 36 be at least about 15°. Side walls 38, 40 are both disposed in a substantially vertical position. It is necessary that first wall 34 incline to some extent from the vertical in order to enlarge the cross-sectional area of the upper portion of chamber 10 for reasons explained above.

First wall 34 is preferably formed in three sections— vertically disposed portion 34a, horizontally disposed portion 34b extending outwardly from the top of vertical portion 34a and extension 34d disposed outwardly and upwardly from the bottom of vertical portion 34a. When referring herein to first wall 34 of chamber 10, reference is intended to vertical portion 34a of first wall 34. Each section is preferably an integral part of the wall structure, although the sections may be fabricated independently. Horizontal portion 34b and extension 34d each serve a function more fully explained below. Furthermore, flanges 34c preferably extend from both sides of first wall 34 so that first wall 34 may be secured to side walls 38, 40. Affixing of first wall 34 to side walls 38, 40 may, however, be achieved by any other suitable means.

Second wall 36 is preferably formed in four portions— a relatively small lower portion 36a, a vertically disposed portion 36b, an upper portion 36c and a horizontally disposed portion 36d which serves as the top wall of chamber 10. In relative position, lower portion 36a is located at the bottom of chamber 10 while horizontal portion 36d is disposed over horizontal portion 34b of the first wall 34 at the top of chamber 10. When referring herein to second wall 36, it is intended that reference be made to vertical portion 36b thereof. The portions of second wall 36 are not fabricated from a single sheet of material as is first wall 34 but are assembled together such that each portion is movable relative to the other portions. As shown in FIGS. 3 and 4, flanges 36e preferably extend from the ends of the respective portions in overlapping position to the next adjacent portion of second wall 36. Flanges 36e are secured to rods 44 which are disposed adjacent the ends of each portion and arranged parallel thereto so as to form a hinged connection between each flange and its respective rod. Thus, rod 44a is located at the intersection of portions 36a and 36b; rod 44b is located at the intersection of portions 36b and 36c; and rod 44c is located at the intersection of portions 36c and 36d. Each portion is therefore hingedly connected to the next adjacent portion. Any other suitable means for fastening the portions of second wall 36 together may be employed.

It is a particular feature of the invention that second wall 36 is adjustably movable relative to first wall 34. This allows varying the dimensions of agglomeration chamber 10 so that agglomerated particulate matter of various sizes may be produced. If large agglomerated particles are desired, high fluid velocity should be maintained in the lower portion of chamber 10 while low fluid velocity should be maintained in the upper portion of chamber 10. This is accomplished by adjusting second wall 36 so that upper portion 36c thereof is at a maximum distance from first wall 34. On the other hand, to obtain smaller agglomerates it is necessary that there not be a large differential between the respective fluid velocities at the lower and upper portions of chamber 10. This is accomplished by adjusting upper portion 36c of second wall 36 such that it is as close as possible to first wall 34.

It is preferred that in adjusting second wall 36 relative to first wall 34 as simple a system as possible be employed. As seen in FIGS. 2, 4 and 5, the presently preferred manner is to provide corresponding arcuate slots 46, 48 and 50 in each side wall 38, 40. Arcuate slot 46 is provided in the vicinity of the intersection of horizontal portion 36d and upper portion 36c of second wall 36. Arcuate slot 48 is located in the vicinity of the intersection of upper portion 36c and vertical portion 36b of second wall 36. Arcuate slot 50 is located in the vicinity of the intersection of lower portion 36a and vertical portion 36b of second wall 36. Arcuate slots 46, 48 and 50 may be readily formed in side walls 38, 40 if the side walls are fabricated of acrylic resin plastic sheet material such as that sold under the trademark Plexiglas or the like. As rods 44 are disposed at the intersections of the respective portions of second wall 36 laterally of those portions, the ends of rods 44a, 44b, and 44c may extend respectively through slots 50, 48 and 46 to maintain second wall 36 in position between side walls 38, 40. If fastening means, such as wing nuts 52, are secured to the ends of rods 44, the ends will be permitted to move within corresponding arcuate slots 46, 48 and 50 and then be fastened in the desired position.

As the portions of second wall 36 are hingedly connected, movement of one portion along an arcuate path will cause corresponding movement of the other portions. For example, if lower portion 36a remains fixed in position while vertical portion 36b is moved from its extreme outward position (as shown in solid lines in FIG. 5) to its extreme inner position (as shown in dotted lines) by moving rod 44b within arcuate slot 48, then upper portion 36c will also move toward its most inward position and rod 44c at the uppermost portion thereof will move within arcuate slot 46; this in turn causes horizontal portion 36d to assume an essentially horizontal position. The degree of movement of rods 44b and 44c within respective arcuate slots 48 and 46 can be readily appreciated in FIGS. 4 and 5. It should be noted that the extreme ends of second wall 36 are hingedly secured by means of rods 44d and 44e, although those rods are only permitted to rotate and not translate. This securing is also accomplished by fastening flanges 36e at the ends of lower portion 36a and horizontal portion 36d respectively to rods 44d and 44e, which are fastened at their ends to side walls 38, 40 by nuts 54 or the like.

As best seen in FIG. 5, in the preferred form of the invention particulate matter is introduced into chamber 10 through supply passageway 56. As explained above, supply passageway 56 may be charged by vibratory feeder 20, which is not shown in FIG. 5. Passageway 56 extends across the entire width of chamber 10 and is directed downwardly toward the lower portion of chamber 10 so that finely divided matter is fed uniformly across the width of chamber 10. In particular, passageway 56 is directed toward entrance zone 58 at the lowermost portion of chamber 10. Passageway 56 may be defined by extension 34d of first wall 34, by additional panel 60 opposite extension 34d and by side walls 38, 40. Panel 60 is in the shape of an obtuse angle, one leg 60d thereof defining a portion of nozzle 56. Panel 60 serves as a chutee along which particulate matter is distributed to entrance zone 58 of chamber 10. Panel 60 may also be fabricated of a suitable material usable in the processing of food, such as stainless steel or the like. Flanges 60a or the like affixed to the side of panel 60 may be used to connect panel 60 to side walls 38, 40. Passageway 56 should be disposed at an angle of at least about 45° from the horizontal but less than about 75° from the horizontal. Preferably, passageway 56 is disposed at an angle of about 60° from the horizontal.

A suitable wetting agent or solvent, e.g. water and/or steam, is directed through solvent passageway 62 toward the particulate matter distributed by supply passageway 56 to entrance zone 58. The solvent or wetting agent wets the particulate matter in entrance zone 58 so that the particles will readily agglomerate within chamber 10. Passageway 62 extends substantially entirely across the width of chamber 10 and is directed upwardly so that the wetting agent is directed toward particulate matter in entrance zone 58. Passageway 62 is defined by second leg 60c of panel 60, by angle panel 64 opposite second leg 60c of panel 60 and by side walls 38, 40. Thus, one leg 60b of panel 60 forms a portion of supply nozzle 56 while other leg 60c forms a portion of solvent nozzle 62. Angle panel 64 defines an acute angle, one leg 64b thereof serving also to define a portion of passageway 62. Angle panel 64, which is also fabricated of a suitable material such as stainless steeel or the like, is secured by flanges 64a or the like to respective side walls 38, 40. Extension 66 of passageway 62 is disposed beyond the perimeters of side walls 38, 40, and when closed at its outer end may serve as a reservoir for the collection of any wetting agent condensate. Manifold or distributor 68 extends across the width of passageway 62 within extension 66, manifold 68 containing a plurality of apertures 70 therein. Pipe 69, see FIG. 2, provides wetting agent to one end of manifold 68. Wetting agent is thus distributed through apertures 70 from manifold 68 and rises through passageway 62 toward entrance zone 58.

Any suitable solvent or wetting agent may be employed to wet the particulate matter. Steam has been found to be most suitable for this purpose where the particulate matter is food particles, such as sugar, although water might also be utilized. Passageway 62 is preferably disposed at an angle of about 120° to supply passageway 56. This requires that passageway 62 be at an angle of between 45° and 75° from the horizontal.

At the vertex of angle panel 64 there is disposed baffle 72 substantially parallel to the part of passageway 62 formed by second leg 60c of panel 60. Baffle 72 is adjustable so that the direction and velocity of flow of wetting agent into entrance zone 58 may be varied. Baffle 72 may be fabricated of any suitable material, such as stainless steel or the like, and is hingedly secured at one end of the vertex of angle panel 64, baffle 72 extending across the entire width of chamber 10 from side wall 38 to side wall 40.

In the vicinity of the end of baffle 72 opposite the vertex of angle panel 64 arcuate slot 74 is formed in each side wall 38, 40. If rod 76 is then fastened parallel to the end of baffle 72 such that the ends of rod 76 extend through corresponding arcuate slots 74 and are secured by fastening devices, then the end of baffle 72 will be permitted to move in an arcuate path relative to panel 60 (as shown in FIG. 5). Baffle 72 is permitted to swing within an arc of about 6°. When baffle 72 is positioned at the midway point along its arcuate path of movement, baffle 72 will be substantially parallel with and directly opposite to second leg 60c of panel 60.

To provide the gaseous medium for directing the wetted particulate matter in entrance zone 58 into chamber 10 for creating the fluidized or agglomerating bed of particulate material within chamber 10, means are associated with the apparatus for introducing the gaseous medium.

In the apparatus of the invention, gaseous medium distributed to chamber 10 primarily through discharge passageway 78, which also has other functions more fully explained below. It should also be noted that gaseous medium enters chamber 10 through passageway 56 and solvent passageway 62. Passageway 78 is defined by second leg 64c of angle panel 64, baffle 72, lower portion 36a of second wall 36 and side walls 38, 40. Passageway 78 extends across the width of chamber 10 and is disposed in a substantially vertical direction. As discharge passageway 78 is preferably defined by movable panels— baffle 72 and lower portion 36a—discharge nozzle 78 is variable in size, shape and position. The relative positions of baffle 72 and lower portion **36*a* control the size of one opening through which the gaseous medium is drawn into chamber 10. Accordingly, the distance between these movable members is of importance. It has been found that the distance between baffle 72 and rod 44*a* should be equal to at least one-half but not more than twice the horizontal measurement between second leg 64*c* of angle panel 64 and rod 44*d* (the width of discharge nozzle 78), this distance being measured along a line drawn transverse to second leg 60*c* of panel 60 and passing through rod 44*a*. It is further preferred that the cross-sectional area of supply passageway 56 be about one-half the cross-sectional area of discharge passageway 78, as measured between second leg 64*c* of angle panel 64 and rod 44*d*. Gaseous medium entering chamber 10 causes the wetted particles therein to continually strike against each other so as to form agglomerates by accretion. Matter that has been agglomerated to satisfactory size is discharged from chamber 10 through entrance zone 58 and product discharge passageway 78**.

Although any suitable gaseous medium may be employed, it has been found that air is particularly effective in causing wetted particulate matter in entrance zone 58 to enter into chamber 10 and form a fluidized bed therein. Air is drawn through supply passageway 56, solvent passageway 62 and discharge passageway 78 and hence through chamber 10 by means of exhaust fan 80 (represented in FIG. 1). However, satisfactory operation is also achieved when no air is drawn through solvent passageway 62. The air passes through chamber 10 from entrance zone 58 to exhaust zone 82 at the uppermost portion thereof, exhaust zone 82 being defined by horizontal portion **34*b* of first wall 34, horizontal portion 36*d* of second wall 36 and side walls 38, 40. As horizontal portion 36*d* is movable relative to horizontal portion 34*b*, the dimensions of exhaust zone 82 may be varied. The size of the agglomerated particles will be affected by the flow rate of air passing through exhaust zone 82 and hence by the dimensions of exhaust zone 82. A larger agglomerated product is obtained by increasing air flow through exhaust zone 82, while smaller agglomerates are formed by reducing the exhaust air flow. Increasing the air flow increases the particle size as the particles are retained for a longer period of time in chamber 10**.

In operating the representative apparatus described, particulate matter is distributed from vibratory feeder 20 through supply passageway 56 into entrance zone 58 of chamber 10. In entrance zone 58 the particulate matter is wetted by a suitable wetting agent, such as steam, directed against the particulate matter via solvent passageway 62. Adjusting baffle 72 at the end of solvent passageway 62 controls the direction of flow and velocity of the wetting agent directed against the particulate matter. Exhaust fan 80 causes the gaseous medium, such as air, to enter chamber 10 through passageway 56, solvent passageway 62 and discharge passageway 78. The amount of gaseous medium brought into chamber 10 is controlled by the respective positions of baffle 72 and lower portion **36*a* of second wall 36. The gaseous medium directs the wetted particulate matter from entrance zone 58 into chamber 10. By adjusting the position of second wall 36, a fluidized bed of solid material may be formed within chamber 10 and maintained in such position by the movement of the gaseous medium through chamber 10. Turbulent fluid flow within chamber 10 causes the suspended wetted particulate matter to strike against each other to agglomerate into particles of larger size. The gaseous medium passes through chamber 10 and exits through exhaust zone 82 at the uppermost portion thereof. When the particles have agglomerated into sufficient size upon continued accretion, they will overcome the buoyant force of the suspending gaseous medium. The agglomerated particles will then be discharged through zone 58 and discharge passageway 78** and be further directed to drying, cooling, screening and other processes.

Example 1

Using apparatus of the type shown in the drawings, sucrose particles were agglomerated. Agglomeration chamber 10 was arranged so that vertical portion **36*b* of second wall 36 was positioned at an angle of about 21° from the vertical. Lower portion 36*a*** was arranged at an angle of about 12° from the vertical.

Granulated sugar (sucrose) was ground in hammer mill 14 to a fine powder having a bulk density of 37.3 lbs. per cu. ft. and a moisture content of 0.07%. This powder was introduced through supply passageway 56 into entrance zone 58 of chamber 10 at a rate of 1640 lbs. per hour and at a temperature of about 91° F. Steam at a pressure of 5 p.s.i.g. was injected through solvent passageway 62 toward the powder in entrance zone 58 at a rate of 196 lbs. per hour. Air was introduced through supply passageway 56 and discharge passageway 78 at a temperature of about 81° F. and a relative humidity of about 53%. Air was drawn through chamber 10 and exited through exhaust zone 82 at a rate of about 544 cu. ft. per minute and at a temperature of about 105° F.

The agglomerated sugar product was discharged from chamber 10 at a temperature of 108° F. and at a moisture content of 0.60%. The agglomerated product was dried to a moisture level of 0.09% in fluidized bed dryer 22 through which air at a temperature of about 290–300° F. and at a flow rate of about 490 cu. ft. per min. passed. The product was then cooled in fluidized bed cooler 26 using air at a temperature of about 98° F. and at a flow rate of about 300 cu. ft. per min. so that a product having 0.06% moisture was obtained. Screening of this product resulted in 6.9% material greater than 8 mesh, 64.3% material −8 mesh +50 mesh and 6.8% material less than 50 mesh. The bulk density of the largest portion of the material was 35.9 lbs. per cu. ft. The product exhibited superior dispersion properties in water.

Example 2

A mixture containing sucrose and carrageenan as the major components was agglomerated in a manner analogous to Example 1 using representative apparatus in accordance with the invention. Agglomeration chamber 10 was arranged such that second wall 36 was positioned at an angle of about 23° from the vertical. Lower portion 36a of second wall 36 was positioned in a substantially vertical direction. Particulate matter making up the mixture was ground in hammer mill 14 after which it had a moisture level of 0.75% and a bulk density of 31.8 lbs. per cu. ft. The particulate matter was supplied to passageway 58 through passageway 56 at a rate of 2095 lbs. per hour and at a temperature of about 81° F. while steam was charged into passageway 58 through solvent passageway 62 at a pressure of 10 p.s.i.g. and at a flow rate of 196 lbs. per hour. Air at a temperature of 80° F. and a relative humidity of 55% was drawn through chamber 10 by fan 80 at a flow rate of 458 cu. ft. per minute. The temperature of the air leaving agglomeration chamber 10 was 90° F.

The agglomerated product had a moisture content of 3.68% and was discharged from chamber 10 at a temperature of about 130° F. The moisture content was reduced to 0.85% by drying in fluidized bed dryer 22 employing heated air at a temperature of about 280–290° F. and at a flow rate of about 480–500 cu. ft. per min. Then followed cooling in fluidized bed cooler 26 employing air at a temperature of about 90° F. and at a flow rate of about 295 cu. ft. per min. to give an agglomerated product containing 0.78% moisture. The product was screened to produce the following fractions:

+8 mesh: 20% of feed material
−8 mesh +50 mesh: 60% of feed material
−50 mesh: 5.7% of feed material The bulk density of the major fraction of the product was 25.6 lbs. per cu. ft. The agglomerated product showed excellent dispersion in water.

Example 3

A mixture of sucrose, cocoa, skim milk solids and malt flour, i.e. chocolate flavored drink mix, was agglomerated using apparatus in accordance with this invention. Second wall 36 was positioned at an angle of about 22° from the vertical while lower portion 36a of second wall 36 was secured in a substantially vertical position in the arrangement employed. The feed material after grinding in hammer mill 14 contained 7.61% moisture and had a bulk density of 38.5 lbs. per cu. ft. The product was distributed through passageway 56 into entrance zone 58 at a rate of 1360 lbs. per hour and at a temperature of about 93° F. while steam was introduced through solvent passageway 62 at a pressure of 20 p.s.i.g. and a flow rate of 282 lbs. per hour. Air at a temperature of 81° F. and a relative humidity of 51% was drawn into agglomeration chamber 10 by fan 80 at a total flow rate of 518 cu. ft. per minute. The temperature of the air leaving chamber 10 through exhaust zone 82 was 105° F.

The agglomerated product had a moisture content of 3.68% and was discharged through nozzle 78 at a temperature of 119° F. The moisture content of the agglomerated product was reduced to 2.22% by drying in fluidized bed dryer 22 utilizing air heated to about 280–295° F. and entering at a flow rate of about 532 cu. ft. per min. Subsequently, the product was cooled in fluidized bed cooler 26 employing air at a temperature of 91° F. and at an input flow rate of 304 cu. ft. per min. to produce a product containing 2.43% moisture. Screening of the product on vibratory screener 28 resulted in a +8 mesh fraction of 3.9% of the feed material, a −8 mesh +50 mesh fraction of 79% of the feed material and a −50 mesh fraction of 5.5% of the feed material. The bulk density of the −8 mesh +50 mesh fraction was 32.7 lbs. per cu. ft. It was found that the flowability and dispersion properties of the product were of a high order.

Thus, the present invention provides an agglomerator having sufficient flexibility to efficiently agglomerate a number of different kinds of particulate matter. A variably adjustable agglomerating apparatus has been provided which allows for improved control of the agglomerating process. Furthermore, the apparatus of the invention is simple in structure and may be readily disassembled for maintenance and repair.

I claim:
1. An agglomerator comprising:
   (a) an agglomeration chamber defined by adjustably movable panels making up walls of said chamber, said chamber having a greater cross sectional area in its upper portion than in its lower portion and being adjustably variable in its dimensions, said chamber having an entrance zone in its lowermost portion and an exhaust zone in its uppermost portion;
   (b) means for movably adjusting said panels;
   (c) means for supplying particulate matter to be agglomerated to said entrance zone of said agglomeration chamber;
   (d) means for wetting the surface of said particulate matter being supplied to said entrance zone; and
   (e) common means for discharging agglomerated particulate matter from said agglomeration zone through said entrance zone and for introducing gaseous medium thereinto via said entrance zone for suspending wetted particulate matter in said agglomeration chamber for agglomeration therein.
2. An agglomerator according to claim 1 wherein said means for wetting the surface of said particulate matter being supplied to said entrance zone includes a baffle for directing a solvent for wetting particulate matter being supplied to said entrance zone.
3. An agglomerator according to claim 1 wherein said means for supplying particulate matter to be agglomerated to said entrance zone includes conduit means communicating with said entrance zone, said conduit means being inclined at an angle in the range from about 45° to not more than about 75° from the horizontal.
4. An agglomerator according to claim 3 wherein said supply means includes vibratory feeding means for supplying particulate matter to said conduit means.
5. An agglomerator according to claim 1 wherein said means associated with said agglomeration chamber for introducing gaseous medium thereinto via said entrance zone comprises gas exhaust means communicating with the exhaust zone in the uppermost portion of said chamber through which said gaseous medium drawn into said chamber via said entrance zone is exhausted from said chamber.
6. An agglomerator according to claim 1 wherein said means for supplying particulate matter to be agglomerated to said entrance zone includes first conduit means communicating with said entrance zone, said first conduit means being inclined at an angle in the range from about 45° to not more than about 75° from the horizontal and wherein said wetting means for wetting the surface of said particulate matter being supplied to said entrance zone comprises second conduit means communicating with said entrance zone, said second conduit means being inclined at an angle in the range from about 45° to not more than about 75° from the horizontal and said first conduit means and said second conduit means being directed substantially toward each other and toward said entrance zone.
7. An agglomeration chamber comprising:
   (a) a first wall disposed in a substantially vertical position;
   (b) a second wall opposite from said first wall and disposed in a substantially vertical position, said second wall being movably adjustable in position relative to said first wall;

(c) means for adjustably moving said second wall relative to said first wall;

(d) a pair of side walls respectively connecting said first and second walls, said first and second walls and said side walls being positioned relative to each other to define a chamber, said chamber being greater in cross sectional area at its upper portion than at its lower portion;

(e) said lower portion of said chamber defining an entrance thereinto through which particulate matter to be agglomerated is introduced into said chamber and through which agglomerated material leaves said chamber;

(f) means for supplying said particulate matter to said entrance of said chamber for agglomeration therein; and (g) means for wetting the surface of said particulate matter supplied to the entrance of said chamber.

8. An agglomeration chamber in accordance with claim 7 wherein said first wall is disposed at an angle of at least about 5° but not greater than 45° from the vertical in the direction away from said second wall.

9. An agglomeration chamber according to claim 7 comprising an adjustably movable top wall disposed in a substantially horizontal position and connecting said pair of side walls at the upper portion of said chamber.

10. A method of agglomerating particulate matter comprising the steps:

(a) supplying an agglomeration chamber with particulate matter through an entrance zone in the lower portion of said chamber, said chamber being provided with adjustable walls for adjusting the dimensions of said chamber and being provided with a gaseous exhaust zone in the upper portion of said chamber;

(b) wetting said particulate matter supplied to said chamber via said entrance zone;

(c) introducing gaseous medium into said chamber via said entrance zone to direct the wetted particulate matter into said chamber, said gaseous medium leaving said chamber via said exhaust zone;

(d) suspending the wetted particulate matter in the gaseous medium introduced into said chamber and passing therethrough from said entrance zone to said exhaust zone;

(e) adjusting the dimensions of said chamber to control the size of the resulting agglomerated particulate matter therein by adjusting the adjustable walls of said chamber to control the dimensions of said chamber;

(f) agglomerating the suspending particulate matter into particles of sufficient size to overcome the buoyant force of the suspending gaseous medium passing through said chamber from said entrance zone through said exahust zone; and (g) discharging the resulting agglomerated particles through the entrance zone of said chamber.

11. A method of agglomerating particulate matter according to claim 10 wherein the particulate matter is wetted by steam.

12. A method of agglomerating according to claim 10 wherein said gaseous medium is air.

References Cited

UNITED STATES PATENTS

| 3,207,824 | 9/1965 | Wurster et al. | 264—117 |
| 3,391,003 | 7/1968 | Armstrong et al. | 99—56 |
| 2,689,973 | 9/1954 | Lee et al. | 264—117 |

S. LEON BASHORE, Primary Examiner

R. H. TUSHIN, Assistant Examiner

23—313; 99—56, 141, DIG. 4, 234; 264—117; 425—222

U.S. Cl. X.R.

UNITED STATES PATENT OFFICE
CERTIFICATE OF CORRECTION

Patent No. 3,700,461                    Dated October 24, 1972

Inventor(s) Alvin J. Dickens, Jr.

It is certified that error appears in the above-identified patent and that said Letters Patent are hereby corrected as shown below:

The title of the invention "GAS SUSPERSION AGGLOMERATION" should correctly read -- GAS SUSPENSION AGGLOMERATION --

Column 3, line 5, "not" should correctly read -- no --

Column 8, line 52, "steeel" should correctly read

-- steel --

Column 11, line 50, "7.61%" should correctly read

-- 1.61% --

Signed and sealed this 22nd day of May 1973.

(SEAL)
Attest:

EDWARD M. FLETCHER, JR.                ROBERT GOTTSCHALK
Attesting Officer                      Commissioner of Patents